(12) United States Patent
Panwar et al.

(10) Patent No.: US 8,571,023 B2
(45) Date of Patent: *Oct. 29, 2013

(54) METHODS AND APPARATUS RELATED TO PACKET CLASSIFICATION BASED ON RANGE VALUES

(75) Inventors: Ramesh Panwar, Pleasanton, CA (US); Deepak Goel, Sunnyvale, CA (US); Srinivasan Jagannadhan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 742 days.

This patent is subject to a terminal disclaimer.

(21) Appl. No.: 12/794,175

(22) Filed: Jun. 4, 2010

(65) Prior Publication Data

US 2011/0134916 A1    Jun. 9, 2011

Related U.S. Application Data

(63) Continuation of application No. 12/242,154, filed on Sep. 30, 2008, now Pat. No. 7,738,454.

(51) Int. Cl.
*H04L 12/28* (2006.01)
*H04J 1/16* (2006.01)

(52) U.S. Cl.
USPC .................. 370/389; 370/392; 370/401

(58) Field of Classification Search
USPC ......... 370/389, 392, 401; 711/216; 365/49.17
See application file for complete search history.

(56) References Cited

U.S. PATENT DOCUMENTS

| 4,215,402 | A | 7/1980 | Mitchell et al. |
| 5,473,607 | A | 12/1995 | Hausman et al. |
| 5,495,476 | A | 2/1996 | Kumar |
| 6,073,160 | A | 6/2000 | Grantham et al. |
| 6,157,955 | A | 12/2000 | Narad et al. |
| 6,212,184 | B1 | 4/2001 | Venkatachary et al. |
| 6,226,629 | B1 | 5/2001 | Cossock |
| 6,266,705 | B1 | 7/2001 | Ullum et al. |
| 6,457,058 | B1 | 9/2002 | Ullum et al. |
| 6,587,466 | B1 | 7/2003 | Bhattacharya et al. |
| 6,600,741 | B1 | 7/2003 | Chrin et al. |

(Continued)

OTHER PUBLICATIONS

H. Jonathan Chao et al. "Matching Algorithms for Three-Stage Bufferless Clos Network Switches" IEEE Communications Magazine, Oct. 2003, pp. 46-54.

(Continued)

*Primary Examiner* — John Pezzlo
(74) *Attorney, Agent, or Firm* — Cooley LLP

(57) ABSTRACT

In one embodiment, an apparatus comprises a range selection module, a first stage of bloom filters, a second stage of bloom filters and a hashing module. The range selection module is configured to define a set of hash key vectors based on a set of range values associated with at least a portion of an address value from a data packet received at a multi-stage switch. The first stage of bloom filters and the second stage of bloom filters are collectively configured to determine that at least a portion of a hash key vector from the set of hash key vectors has a probability of being included in a hash table. The hashing module is configured to produce a hash value based on the hash key vector such that a first policy vector is selected based on the hash value and the first policy vector is decompressed to produce a second policy vector associated with the data packet.

20 Claims, 7 Drawing Sheets

(56) References Cited

U.S. PATENT DOCUMENTS

| | | |
|---|---|---|
| 6,600,744 B1 | 7/2003 | Carr et al. |
| 6,618,397 B1 | 9/2003 | Huang |
| 6,654,373 B1 | 11/2003 | Maher, III et al. |
| 6,658,482 B1 | 12/2003 | Chen et al. |
| 6,665,274 B1 | 12/2003 | Yamada |
| 6,675,163 B1 | 1/2004 | Bass et al. |
| 6,721,316 B1 | 4/2004 | Epps et al. |
| 6,731,631 B1 | 5/2004 | Chang et al. |
| 6,731,644 B1 | 5/2004 | Epps et al. |
| 6,735,670 B1 | 5/2004 | Bronstein et al. |
| 6,754,662 B1 | 6/2004 | Li |
| 6,778,532 B1 | 8/2004 | Akahane et al. |
| 6,778,546 B1 | 8/2004 | Epps et al. |
| 6,778,984 B1 | 8/2004 | Lu et al. |
| 6,789,118 B1 | 9/2004 | Rao |
| 6,813,243 B1 | 11/2004 | Epps et al. |
| 6,859,455 B1 | 2/2005 | Yazdani et al. |
| 6,862,278 B1 | 3/2005 | Chang et al. |
| 6,889,225 B2 | 5/2005 | Cheng et al. |
| 6,917,946 B2 | 7/2005 | Corl, Jr. et al. |
| 6,925,085 B1 | 8/2005 | Krishna et al. |
| 6,940,862 B2 | 9/2005 | Goudreau |
| 6,947,931 B1 | 9/2005 | Bass et al. |
| 6,977,930 B1 | 12/2005 | Epps et al. |
| 7,042,878 B2 | 5/2006 | Li |
| 7,089,240 B2 | 8/2006 | Basso et al. |
| 7,133,400 B1 | 11/2006 | Henderson et al. |
| 7,136,926 B1 | 11/2006 | Iyer et al. |
| 7,173,931 B2 | 2/2007 | Chao et al. |
| 7,190,696 B1 | 3/2007 | Manur et al. |
| 7,193,997 B2 | 3/2007 | Van Lunteren et al. |
| 7,227,842 B1 | 6/2007 | Ji et al. |
| 7,233,568 B2 | 6/2007 | Goodman et al. |
| 7,233,579 B1 | 6/2007 | Crump et al. |
| 7,277,429 B2 | 10/2007 | Norman et al. |
| 7,325,074 B2 | 1/2008 | McRae |
| 7,349,415 B2 | 3/2008 | Rangarajan et al. |
| 7,356,033 B2 | 4/2008 | Basu et al. |
| 7,369,557 B1 * | 5/2008 | Sinha ........................... 370/392 |
| 7,369,561 B2 | 5/2008 | Wybenga et al. |
| 7,373,345 B2 | 5/2008 | Carpentier et al. |
| 7,382,637 B1 | 6/2008 | Rathnavelu et al. |
| 7,382,777 B2 | 6/2008 | Irish et al. |
| 7,382,876 B2 | 6/2008 | Lauter et al. |
| 7,383,244 B2 | 6/2008 | Bass et al. |
| 7,394,809 B2 | 7/2008 | Kumar et al. |
| 7,403,524 B2 | 7/2008 | Hill |
| 7,403,526 B1 | 7/2008 | Zou et al. |
| 7,418,505 B2 | 8/2008 | Lim et al. |
| 7,441,268 B2 | 10/2008 | Remedios |
| 7,480,302 B2 | 1/2009 | Choi |
| 7,543,052 B1 | 6/2009 | Cesa Klein |
| 7,602,787 B2 | 10/2009 | Cheriton |
| 7,610,330 B1 | 10/2009 | Quinn |
| 7,646,771 B2 | 1/2010 | Guru et al. |
| 7,668,160 B2 | 2/2010 | Narayan et al. |
| 7,738,454 B1 | 6/2010 | Panwar et al. |
| 2002/0138648 A1 | 9/2002 | Liu |
| 2002/0152209 A1 | 10/2002 | Merugu et al. |
| 2002/0191605 A1 | 12/2002 | Lunteren et al. |
| 2003/0023846 A1 | 1/2003 | Krishna et al. |
| 2003/0030575 A1 | 2/2003 | Frachtenberg et al. |
| 2003/0053460 A1 | 3/2003 | Suda et al. |
| 2003/0059045 A1 | 3/2003 | Ruehle |
| 2003/0156586 A1 | 8/2003 | Lee et al. |
| 2003/0219017 A1 | 11/2003 | Davis et al. |
| 2003/0223424 A1 | 12/2003 | Anderson et al. |
| 2003/0233516 A1 | 12/2003 | Davis et al. |
| 2004/0015599 A1 | 1/2004 | Trinh et al. |
| 2004/0028046 A1 | 2/2004 | Govindarajan et al. |
| 2004/0100950 A1 | 5/2004 | Basu et al. |
| 2004/0100959 A1 | 5/2004 | Relan |
| 2004/0190526 A1 | 9/2004 | Kumar et al. |
| 2004/0254909 A1 | 12/2004 | Testa |
| 2004/0258067 A1 | 12/2004 | Irish et al. |
| 2004/0264373 A1 | 12/2004 | Engbersen et al. |
| 2005/0083935 A1 | 4/2005 | Kounavis et al. |
| 2005/0141510 A1 | 6/2005 | Narsinh et al. |
| 2005/0226235 A1 | 10/2005 | Kumar et al. |
| 2005/0232261 A1 | 10/2005 | Wybenga et al. |
| 2005/0237938 A1 | 10/2005 | Corl Jr, et al. |
| 2006/0050690 A1 | 3/2006 | Epps et al. |
| 2006/0083247 A1 | 4/2006 | Mehta |
| 2006/0195896 A1 | 8/2006 | Fulp et al. |
| 2006/0218167 A1 | 9/2006 | Bosley et al. |
| 2006/0221954 A1 | 10/2006 | Narayan et al. |
| 2006/0221956 A1 | 10/2006 | Narayan et al. |
| 2006/0221967 A1 | 10/2006 | Narayan et al. |
| 2007/0008962 A1 | 1/2007 | Basu et al. |
| 2007/0070900 A1 | 3/2007 | Heink et al. |
| 2007/0071233 A1 | 3/2007 | Zak |
| 2007/0115986 A1 | 5/2007 | Shankara |
| 2007/0133593 A1 | 6/2007 | Shankara |
| 2007/0234005 A1 | 10/2007 | Erlingsson et al. |
| 2007/0244951 A1 * | 10/2007 | Gressel et al. ................ 708/252 |
| 2007/0283045 A1 | 12/2007 | Nguyen et al. |
| 2008/0177812 A1 | 7/2008 | Brandle |
| 2008/0186974 A1 | 8/2008 | Singh et al. |
| 2008/0228798 A1 | 9/2008 | Van Lunteren |
| 2009/0196297 A1 | 8/2009 | Jabr |
| 2010/0040067 A1 | 2/2010 | Hao et al. |
| 2010/0080224 A1 | 4/2010 | Panwar et al. |
| 2010/0083345 A1 | 4/2010 | Panwar et al. |

OTHER PUBLICATIONS

Itamar Elhanany et al. "High-performance Packet Switching Architectures" Springer Science & Business Media, ISBN-10: 184628273X, 2002, Chapter 10, 20 pages.

Office Action mailed Feb. 17, 2010 for U.S. Appl. No. 12/242,168 (12 pages).

Office Action mailed Feb. 16, 2010 for U.S. Appl. No. 12/242,172 (11 pages).

Office Action mailed May 10, 2010 for U.S. Application No. 12/242,143 (23 pages).

Office Action mailed Jun. 10, 2010 for U.S. Appl. No. 12/242,278, filed Sep. 30, 2008 (24 pages).

Office Action mailed Apr. 23, 2010 for U.S. Appl. No. 12/347,495 (11 pages).

U.S. Appl. No. 12/242,143, filed Sep. 30, 2008, entitled "Methods and Apparatus for Compression in Packet Classification" (34 pgs).

U.S. Appl. No. 12/242,125, filed Sep. 30, 2008, entitled "Methods and Apparatus for Range Matching During Packet Classification Based on a Linked-Node Structure" (39 pgs).

U.S. Appl. No. 12/242,278, filed Sep. 30, 2008, entitled "Methods and Apparatus to Implement Except Condition During Data Packet Classification" (35 pgs).

U.S. Appl. No. 12/242,158, filed Sep. 30, 2008 entitled "Methods and Apparatus for Producing a Hash Value Based on a Hash Function" (37 pgs).

U.S. Appl. No. 12/347,495, filed Dec. 31, 2008 entitled "Methods and Apparatus for Packet Classification Based on Multiple Conditions" (40 pgs).

U.S. Appl. No. 12/347,499, filed Dec. 31, 2008 entitled "Methods and Apparatus for Packet Classification Based on Multiple Conditions " (41 pgs).

U.S. Appl. No. 12/347,418, filed Dec. 31, 2008 entitled "Methods and Apparatus for Indexing Set Bit Values in a Long Vector Associated with a Switch Fabric" (35 pgs).

* cited by examiner

METHODS AND APPARATUS RELATED TO PACKET CLASSIFICATION BASED ON RANGE VALUES

CROSS-REFERENCE TO RELATED PATENT APPLICATION

This application is a continuation application of U.S. patent application Ser. No. 12/242,154 entitled "Methods and Apparatus Related to Packet Classification Based on Range Values," filed Sep. 30, 2008 (now U.S. Pat. No. 7,738,454), which is incorporated herein by reference in its entirety.

BACKGROUND

Embodiments described herein relate generally to packet classification, and, in particular, to packet classification based on range values.

A data packet received at a network device can be processed based on one or more policies established by, for example, a network administrator. Any processing performed so that the data packet can be subsequently processed at the network device based on a policy can be referred to as packet classification. Packet classification can include, for example, associating the data packet with an appropriate policy from a library of policies based on information included in the data packet such as an address value and/or a port value. A packet classification scheme can be used to, for example, distinguish and route groups of data packets within a firewall or through a switch fabric associated with a multi-stage switch.

Known packet classification schemes, such as those based on Ternary Content Addressed Memories (TCAMs) or software algorithms, can have power requirements, chip area requirements, efficiency characteristics, and/or storage requirements that may be undesirable in some applications. For example, known software packet classification algorithms that rely on relatively large data structures resident in external memory (external to a processing chip) may have memory bandwidth limitations that can make their use in very high speed switches and routers impractical. Power consumption requirements and/or inefficient chip designs associated with some known packet classification schemes may substantially prevent scaling of these packet classification schemes, for example, for use in a complex routing system such as a data center.

Thus, a need exists for methods and apparatus for packet classification that have desirable power, chip area, efficiency, and/or storage characteristics.

SUMMARY OF THE INVENTION

In one embodiment, an apparatus comprises a range selection module, a first stage of bloom filters, a second stage of bloom filters and a hashing module. The range selection module is configured to define a set of hash key vectors based on a set of range values associated with at least a portion of an address value from a data packet received at a multi-stage switch. The first stage of bloom filters and the second stage of bloom filters are collectively configured to determine that at least a portion of a hash key vector from the set of hash key vectors has a probability of being included in a hash table. The hashing module is configured to produce a hash value based on the hash key vector such that a first policy vector is selected based on the hash value and the first policy vector is decompressed to produce a second policy vector associated with the data packet.

DETAILED DESCRIPTION

Figure 1:
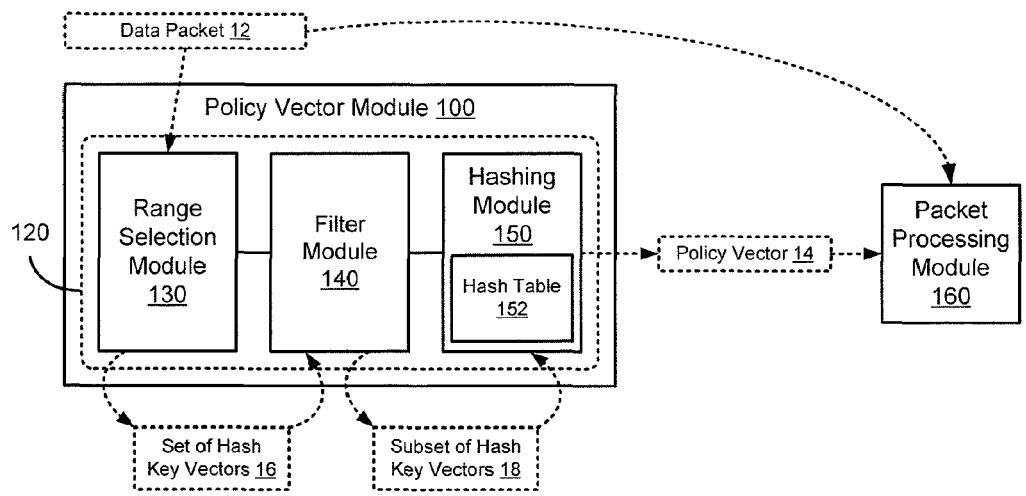
FIG. 1 is a schematic block diagram that illustrates a policy vector module configured to produce a policy vector based on a data packet, according to an embodiment.

A data packet (e.g., an internet protocol (IP) packet, a session control protocol packet, a media packet) received at, for example, a switch device such as a multi-stage switch can be processed based on a policy. The policy can include a policy condition and an instruction that can be executed when the policy condition is satisfied. For example, the policy can be a policy to route a data packet to a particular destination (instruction) if the data packet has an address value that falls within a specified range of address values (policy condition). In some embodiments, this type of policy condition can be referred to as a match condition or as a filter condition. In some embodiments, the data packet can be associated with a flow of data packets.

A policy vector module can be configured to process a portion of a data packet (e.g., a field, a payload, an address portion, a port value portion) via a processing pipeline to determine whether or not a policy condition is satisfied. The policy vector module can be configured to produce (e.g., select), based on the processing through the pipeline, a policy vector that represents whether or not the policy condition is satisfied. Specifically, the policy vector can include one or more bit values that represent that the policy condition associated with a policy has been satisfied. The policy vector can be used to trigger processing of the data packet based on an instruction associated with the policy (when the bit value(s) indicate that the policy condition has been satisfied). In some embodiments, the portion of the data packet can be referred to as a facet and a policy vector can be referred to as a facet cover vector.

In some embodiments, the portion of the data packet can be associated with an address value (e.g., a destination address value, a source address value) included in the data packet. In some embodiments, the policy condition can be a longest prefix length value match condition or a range match condition. In some embodiments, the pipeline of modules can be implemented as hardware modules or as a combination of hardware modules and software modules. In some embodiments, the policy vector module can be hardware implementation of a hash-based search function.

In some embodiments, the policy vector module can be included in a packet classification module of, for example, a multi-stage switch. The packet classification module at the multi-stage switch can be configured to classify a data packet received at the multi-stage switch from a network entity. Classifying can include any processing performed so that the data packet can be processed at the multi-stage switch based on a policy. An example of a policy vector module included in a packet classification module is described below in connection with FIG. 12.

In some embodiments, a vector, such as the policy vector, can be a binary string defined by, for example, a sequence of high values (represented as 1's) and/or low values (represented as 0's). The values in the binary string can be referred to as bit values. In other words, the vector can define a sequence of bit values. In some embodiments, for example, if a policy vector module is implemented in a hardware system that is a base-n system (e.g., a base-4 system), a vector processed by the policy vector module can be a base-n bit string. In some embodiments, the vector can be defined as a one-dimensional array. In some embodiments, for example, if a policy vector module is implemented in software, a vector processed by the policy vector module can be a string that includes a sequence of symbols (e.g., American Standard Code for Information Interchange (ASCII) characters) and/or digits. For example, the vector can be a byte string or a hexadecimal value.

FIG. 1 is a schematic block diagram that illustrates a policy vector module 100 configured to produce a policy vector 14 based on a data packet 12, according to an embodiment. The policy vector module 100 includes a range selection module 130, a filter module 140, and a hashing module 150. In some embodiments, these modules can collectively be referred to as a processing pipeline 120.

The range selection module 130 can be configured to define a set of hash key vectors 16 based on at least a portion of the data packet 12 and based on range values included in a range table (not shown in FIG. 1). The filter module 140 can be configured to discard one or more of the hash key vectors from the set of hash key vectors 16 when a filter condition is satisfied. Hash key vectors from the set of hash key vectors 16 that are not discarded at the filter module 140 can define a subset of hash key vectors 18. In some embodiments, the hash key vectors that are not discarded can be referred to as surviving hash key vectors, as remainder hash key vectors, or as selected hash key vectors. The policy vector 14 is produced by the hashing module 150 based on processing of the subset of hash key vectors 18 at the hashing module 150. Specifically, policy vector 14 can be retrieved from a hash table 152 at the hashing module 150 based on one of the hash key vectors from the subset of hash key vectors 18.

The set of hash key vectors 16 can be defined based on a set of range values and based on a portion of the data packet 12. Specifically, each hash key vector from the set of hash key vectors 16 can be defined based on a range value from the set of range values and the portion of the data packet 12. In some embodiments, the range values can be prefix length values and/or ranges of port values. An example of a hash key vector defined based on a range value and a portion of a data packet is described below in connection with FIG. 2.

Figure 2:
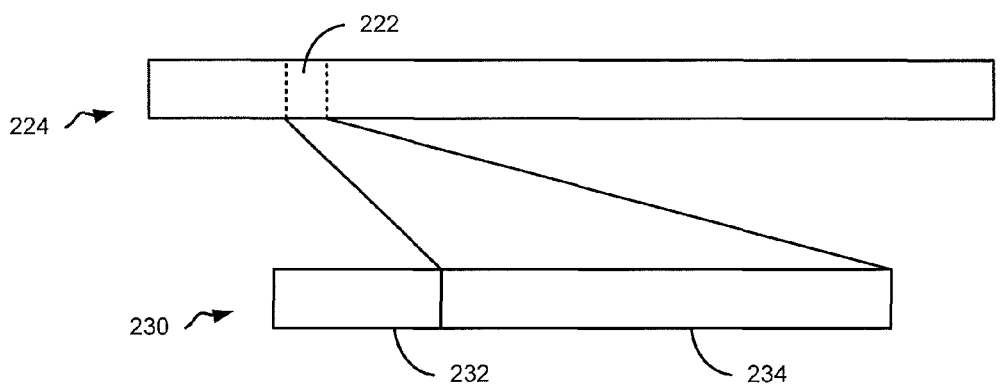
FIG. 2 is a schematic block diagram that illustrates a hash key vector that can be defined by a range selection module, according to an embodiment.

FIG. 2 is a schematic block diagram that illustrates a hash key vector 230 that can be defined by a range selection module, according to an embodiment. The range selection module can be similar to (or the same as) the range selection module 130 shown in FIG. 1. As shown in FIG. 2, the hash key vector 230 includes a first portion 234 and a second portion 232. In this embodiment, the hash key vector 230 is defined by concatenating the first portion 234 with the second portion 232. As shown in FIG. 2, the first portion 234 of the hash key vector 230 can be defined based on bit values from a portion 222 of the data packet 224. In some embodiments, the bit values of the portion 222 of the data packet 224 can be modified before being included in the hash key vector 230 as the first portion 234.

In this embodiment, the first portion 234 includes bit values that correspond to bit values that define an address value (e.g., a destination address value, a source address value) within the portion 222 of the data packet 224. The address value can be, for example, a source address value or a destination address value included in the data packet 224. Specifically, the first portion 234 includes bit values that correspond to the address value of the portion 222 masked based on a range value. The first portion 234 can be padded with trailing zero bit values so that first portion 234 has a specified bitwise length (e.g., 32 bits) or so that the entire hash key vector 230 has a specified bitwise length (e.g., 72 bits).

Also, in this embodiment, the second portion 232 includes bit values that represent the range value used as a mask in the first portion 234 of the hash key vector 230. The range value can be a prefix length value that can represent the number of leading bit values of an IP address value that can, for example, identify or be associated with a portion of a network. The leading bit values of an IP address value can be used to identify, for example, a portion of a network (can be referred to as a sub-network). Accordingly, network devices associated with the portion of the network can have IP address values with identical sequences of leading bit values. In some embodiments, the sequence of leading bit values can be referred to as a routing prefix and can be associated with a domain or a host.

An example of a binary representation of a set of hash key vectors defined based on the IP address value 203.104.0.23 and the prefix length values of 17, 18, and 19, respectively, are shown below:

010000 11001011 01101000 00000000 00000000
    010001 11001011 01101000 00000000 00000000
    010010 11001011 01101000 00000000 00000000

In some embodiments, the prefix length values can be represented in text by the notation "/n" (e.g., a prefix length value of 17 can be shown as /17). In this embodiment, the prefix length value is represented by the first 6 bit values and the masked address value with padded zeros is represented by the trailing 32 bit values. In this embodiment, the prefix length value is represented by a binary string that is equal to the prefix length value minus one. For example, a prefix length value of 1 is represented by the binary string 000000, the prefix length value of 17 is represented by the binary string 010000, and the prefix length value of 64 is represented by the binary string 111111.

In some embodiments, the hash key vector 230 can include different portions than those shown in FIG. 2. In some embodiments, for example, the hash key vector 230 can be defined without the second portion 232. In some embodiments, the second portion 232 can be a metadata tag that represents a characteristic of the hash key vector 230 (e.g., a length of the hash key vector 230) and/or a characteristic of the data packet 224 (e.g., an Ethertype). In some embodiments, the hash key vector 230 can also include a third portion (not shown) that is concatenated within the hash key vector 230 shown in FIG. 2. The third portion can represent the protocol used to define the address value within the data packet 224. For example, the third portion can include a set of bit values that represent that the data packet 224 is defined based on, for example, internet protocol version 4 (IPv4) or internet protocol version 6 (IPv6).

In some embodiments, the portion 222 can be, for example, a field (or a portion of a field) from a header, a payload, and/or a trailer of the data packet 224. In some embodiments, the portion 222 can be referred to as a facet. In some embodiments, the portion 222 can be associated with a port value (e.g., a source port value, a destination port value) included within the data packet 224, and the second portion 232 can be associated with a range of port values. In some embodiments, the bit values of the portion 222 of the data packet 224 can be modified before being included in the hash key vector 230. In some embodiments, the hash key vector 230 can be referred to as a key vector.

Referring back to FIG. 1, the range selection module 130 can be configured to define the set of hash key vectors 16 based on a set of range values. The range selection module 130 can be configured to retrieve the set of range values from a range table based on at least a portion of the data packet 12. For example, the range selection module 130 can be configured to retrieve a set of range values using a portion of the data packet 12 as a key value (also can be referred to as a look-up value or as a key). In some embodiments, the portion can be from bit values that define an address value or a port value included in the data packet 12. In some embodiments, the portion can be a specified number of bit values (e.g., 6 bit values). Each of the range values from the set of range values can be used by the range selection module 130 to define a hash key vector such as that described in connection with FIG. 2. For example, the range selection module 130 can be configured to define three hash key vectors based on three different prefix length values and/or ranges of port values retrieved from a range table.

In some embodiments, after the set of range values have been retrieved from a range table, each hash key vector from the set of hash key vectors 16 can be defined serially based on a range value from the set of range values. In some embodiments, the set of hash key vectors 16 can be defined at the range selection module 130 based on parallel processing. In some embodiments, the set of hash key vectors 16 can be defined at the range selection module 130 based on some combination of serial processing and parallel processing.

Figure 3:
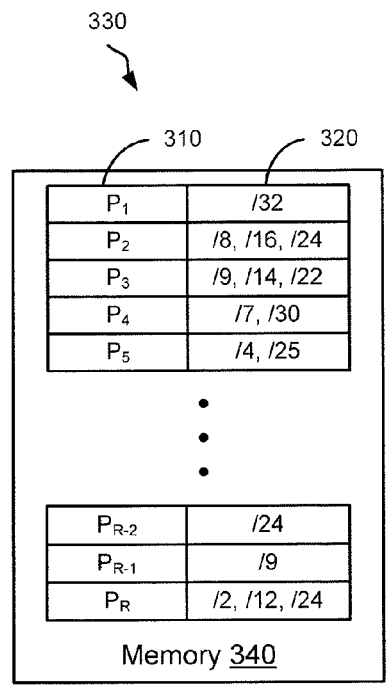
FIG. 3 is a schematic block diagram that illustrates a range table, according to an embodiment.

FIG. 3 is a schematic block diagram that illustrates a range table 330, according to an embodiment. As shown in FIG. 3, the range table 330 includes various range values (column 320) that are associated with entry values $P_1$ through $P_R$ (column 310). In this embodiment, the range values 320 can be prefix length values. For example, entry value $P_2$ is associated with prefix length values /8, /16, and /24. In some embodiments, the entry values 310 can be binary strings and the range table 330 can be stored in a memory 340. In some embodiments, one or more of the entry values 310 can be associated with more than three range values 320.

A range selection module, such as range selection module 130 shown in FIG. 1, can be configured to use a key value defined based on bit values from a data packet to retrieve range values from the range table 330. If the key value matches an entry value from the entry values 310, the range values 320 associated with the entry value can be used to define a set of hash key vectors. For example, a range selection module can be configured to define a key value based on the first 8 bits of an address value of a data packet. If the key value matches (e.g., corresponds with) entry value $P_5$, the range selection module can be configured to define two different hash key vectors based on prefix length values /4 and /25 (which are associated with entry value $P_5$) and based on an address value from the data packet.

Although not shown, in some embodiments, a range table can be defined so that one or more range values can be retrieved from the range table when a condition is satisfied. For example, if a data packet is associated with a particular date-time and/or has a field value from a header, a payload, and/or a trailer of the data packet, a specified set of range values can be retrieved and used to define one or more hash key vectors.

In some embodiments, the range values 320 and/or the entry values 310 can be defined based on empirical data related to range values associated with specified entry values. In some embodiments, the range values included in the range table 330 can correspond to one or more range values included in a policy condition associated with a policy. In some embodiments, the number of entries R in the range table 330 can be defined based on the number of bit values included in the entry values 310. For example, R can equal 256 if the entry values 310 are 8 bit strings (which can represent values from 0 to 255). In some embodiments, the number of entries in the range table 330 (which can be correlated to the number of bit values included in the entry values 310) can be defined based on an access speed associated with the range table 330. For example, the number of entries in the range table 330 can be defined to decrease a length of time consumed when retrieving one of the entry values 310 from the range table 330.

In some embodiments, the range table 330 can be stored in a memory 340 that can be any type of memory such as, for example, a read-only memory (ROM) or a random-access memory (RAM). In some embodiments, the range table 330 can be a look-up table (LUT) or a memory array. In some embodiments, the range table 330 can be a database (e.g., a relational database).

Referring back to FIG. 1, the filter module 140 can be configured to receive the set of hash key vectors 16 defined by the filter module 140 and can be configured to discard one or more of the hash key vectors from the set of hash key vectors 16 when a filter condition is satisfied. Hash key vectors that are not discarded (can be referred to as selected hash key vectors or as surviving hash key vectors) can define a subset of hash key vectors 18 that can be sent to and processed at the hashing module 150.

The filter module 140 can be configured to discard one or more of the hash key vectors from the set of hash key vectors 16 that have a probability below a specified threshold or no probability of being included in the hash table 152 associated with the hashing module 150. By discarding one or more of the hash key vectors 16 to define the subset of hash key vectors 18, the processing time of the hashing module 150 can be reduced. Specifically, the policy vector 14 can be retrieved by accessing the hash table 152 based on the hash key vectors from the subset of hash key vectors 18, rather than based on the hash key vectors from the larger set of hash key vectors 16. In some embodiments, accessing the hash table 152 at the hashing module 150 can be computationally intensive and/or time consuming.

In some embodiments, if all of the hash key vectors from the set of hash key vectors 16 are discarded at the filter module 140, the policy vector module 100 can be configured to, for example, produce a default policy vector (not shown). In some embodiments, if all of the hash key vectors from the set of hash key vectors 16 are to be discarded at the filter module 140, the filter module 140 can be configured to, for example, recover one or more of the hash key vectors from the set of hash key vectors 16 and send them to the hashing module 150 for processing. One or more of the hash key vectors from the set of hash key vectors 16 can be recovered from, for example, a memory (not shown) where the hash key vectors are temporarily stored.

In some embodiments, the filter module 140 can be configured to implement one or more bloom filters in serial and/or in parallel. In other words, the filter module 140 can be (e.g., can be defined by) a bloom filter module, or can include (e.g., can be defined by) multiple bloom filter modules. More details related to bloom filter modules and bloom filter module operation in serial and/or in parallel are discussed in connection with FIGS. 4 and 5.

Figure 4:
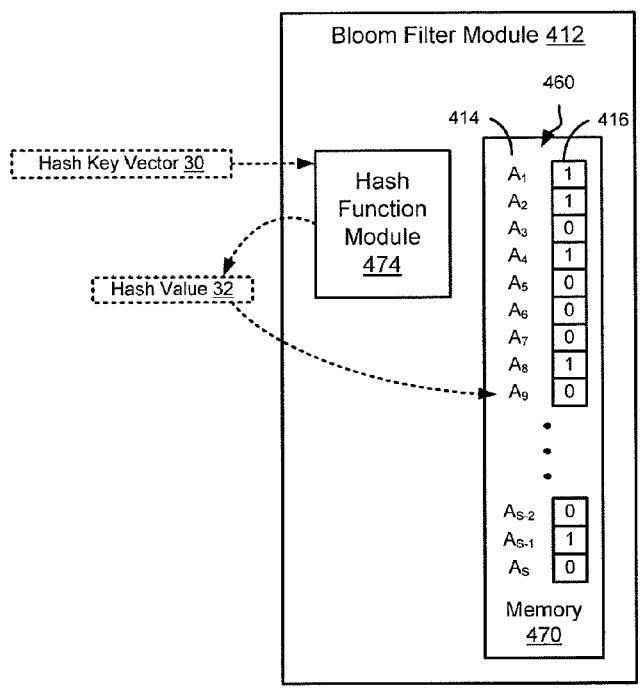
FIG. 4 is a schematic block diagram that illustrates a bloom filter module, according to an embodiment.

FIG. 4 is a schematic block diagram that illustrates a bloom filter module 412, according to an embodiment. The bloom filter module 412 includes a filter table 460 that has filter values 416 that are each stored at a location within a memory 470 represented by one of the address values $A_1$ through $A_S$ (shown in column 414). In some embodiments, the address values 414 can be referred to as memory address values. In some embodiments, the memory 470 can be any type of memory such as a ROM or a RAM, and the filter table 460 can be a LUT, a memory array, and/or a database (e.g., a relational database).

The bloom filter module 412 also includes hash function module 474 configured to define a hash value 32 based on a hash key vector 30. The hash key vector 30 can be from, for example, a set of hash key vectors (e.g., the set of hash key vectors 16 shown in FIG. 1) received from a range selection module (e.g., the range selection module 130 shown in FIG. 1). The hash value 32 can be used to locate at least one of the filter values 416 stored in the filter table 460 at a particular address value 414. In other words, the hash value 32 can be used as an index into the filter table 460. In some embodiments, the hash value 32 can correspond with at least one of the address values 414. In some embodiments, the hash value 32 can be referred to as an index value, a hash code, a hash sum, and so forth.

The filter values 416 can be used to determine whether or not a hash key vector such as the hash key vector 30 should be discarded. Specifically, the filter values 416 can be defined so that when a retrieved filter value satisfies a condition, the hash value used to retrieve the filter value should be discarded. The filter values 416 can be defined so that if the hash key vector 30 has a probability below a specified threshold or no probability of being included in a hash table associated with a hashing module (such as hash table 152 included in hashing module 150 shown in FIG. 1), the hash key vector 30 will be discarded. In some embodiments, the filter values 416 can be defined based on potential hash key vector values (e.g., a group of hash key vector values derived from empirical data) that can be processed at the bloom filter module 412. In some embodiments, the filter table 460 can have a relatively sparse population of filter values 416 (e.g., a relatively small percentage of "1" values).

For example, as shown in FIG. 4, the hash value 32 defined at the hash function module 474 based on the hash key vector 30 can be used to access a filter value of "0" (column 416) at address value $A_9$. Because the filter value is 0 (rather than "1"), the hash key vector 30 is not discarded and can be referred to as a surviving hash key vector. In some embodiments, the hash key vector 30, after being processed at the bloom filter module 412 and surviving, can be sent to, for example, a hashing module such as hashing module 150 shown in FIG. 1 for further processing. If the hash value 32 had been used to retrieve a filter value of 1, for example, from address value $A_8$, the hash key vector 30 would have been discarded.

In some embodiments, the filter values 416 can be combinations of bit values (e.g., a sequence of bit values) rather than single bit values. In some embodiments, discarding of a hash key vector can be based on multiple filter values 416 included in the filter table 460. For example, a discard determination with respect to hash key vector 30 can be made based on whether or not multiple filter values 416 from the filter table 460 satisfy a specified condition. In such cases, multiple hash function modules (not shown) can be used to produce multiple hash values (not shown) based on hash key vector 30.

In some embodiments, the hash function module 474 can be based on any type of hash function configured to define the hash value 32 based on the hash key vector 30. In some embodiments, the hash function module 474 can be configured to define the hash value 32 based on a subset of predefined vectors (also can be referred to as predefined bit vectors) selected from a set of predefined vectors and based on a series of bitwise operations related to the subset of predefined vectors. The subset of predefined vectors can be selected from the set of predefined vectors based on a sequence of bit values (e.g., binary bit values) defining the hash key vector 30. For example, a predefined vector can be selected from a set of predefined vectors when a condition associated with a bit value (or combination of bit values) from the hash key vector 30 is satisfied. More details related to a hash function module are set forth in U.S. patent application Ser. No. 12/242,158, filed Sep. 30, 2008, entitled "Methods and Apparatus for Producing a Hash Value based on a Hash Function," which is incorporated herein by reference in its entirety.

In some embodiments, after being processed at bloom filter module 412, a surviving the hash key vector can be processed at an additional bloom filter module (not shown in FIG. 4). For example, after being processed at bloom filter module 412, hash key vector 30 (which is not to be discarded) can be processed (e.g., serially processed) at an additional bloom filter module (not shown in FIG. 4). The additional bloom filter module can include a hash function module (not shown) different than the hash function module 474 included in the bloom filter module 412. Accordingly, a hash value (not shown) different than hash value 32 can be defined based on the hash key vector 30. In some embodiments, the hash function module and/or the bloom filter module 412 can be included in a bank of bloom filters (not shown in FIG. 4). Also, the additional bloom filter module can also include a filter table (not shown) different than the filter table 460 included in the bloom filter module 412.

In some embodiments, the hash value 32 can be defined based on a portion of the hash key vector 30. Potential collisions (identical hash values defined based on different hash key vectors) can be reduced by defining the hash value 32 based on a relatively large portion of the hash key vector 30. Defining the hash value 32 based on a relatively large portion of the hash key vector 30, however, can result in a relatively large filter table 460 and relatively slow filter table 460 access times. In some embodiments, a length of the filter table 460 can be less than a length of a hash table such as hash table 152 shown in FIG. 1.

In some embodiments, the filter table 460 can include a logic module (not shown) that can use bit values that define the hash value 32 to retrieve one of the filter values 414 from the filter table 460. In other words, this logic module can be configured to translate the hash value 32 into one of the address values 414 of the memory 470.

Figure 5:
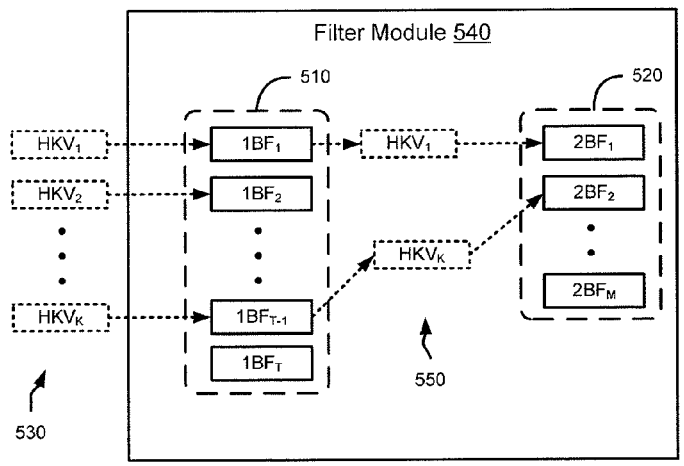
FIG. 5 is a schematic block diagram that illustrates a filter module that has two banks of bloom filter modules, according to an embodiment.

FIG. 5 is a schematic block diagram that illustrates a filter module 540 that has two banks of bloom filter modules, according to an embodiment. In some embodiments, the banks of bloom filter modules can be referred to as stages of bloom filter modules. As shown in FIG. 5, a first bank of bloom filter modules 510 includes bloom filter modules $1BF_1$ through $1BF_T$ and a second bank of bloom filter modules 520 includes bloom filter modules $2BF_1$ through $2BF_M$. The bloom filter modules $1BF_1$ through $1BF_T$ are configured to operate in parallel with one another, and the bloom filter modules $2BF_1$ through $2BF_M$ are also configured to operate in parallel with one another. In this embodiment, vectors are shown as dotted boxes, and processing paths are shown as dotted lines.

As shown in FIG. 5, a set of hash key vectors 530 that includes hash key vectors $HKV_1$ through $HKV_K$ are processed at the first bank of bloom filter modules 510. As shown in FIG. 5, each hash key vector from the set of hash key vectors 530 is processed at a bloom filter module from the first bank of bloom filter modules 510. In this embodiment, bloom filter module $1BF_T$ is the only bloom filter module that is idle. In some embodiments, the hash key vectors 530 can be distributed to the first bank of bloom filter modules 510 in a different fashion than the distribution pattern shown in FIG. 5. For example, in some embodiments, hash key vector $HKV_2$ can be processed at bloom filter module $1BF_T$ rather than at bloom filter module $1BF_2$.

In this embodiment, hash key vectors $HKV_1$ and hash key vector $HKV_K$, which survive processing at the first bank of bloom filter modules 510, and are sent to the second bank of bloom filter modules 520 for further processing. The hash key vectors $HKV_1$ and hash key vector $HKV_K$ can collectively be referred to as surviving hash key vectors 550. As shown in FIG. 5, at least hash key vector $HKV_2$ is discarded based on processing at bloom filter module $1BF_2$ ($HKV_2$ is not sent on to the second stage of bloom filters 520). In some embodiments, the surviving hash key vectors 550 can be distributed to the second bank of bloom filter modules 520 in a different fashion than the distribution pattern shown in FIG. 5. For example, in some embodiments, hash key vector $HKV_1$ can be processed at bloom filter module $2BF_M$ rather than at bloom filter module $1BF_1$.

In some embodiments, the index value T (the index value associated with the first bank of bloom filters 510) can be equal to 16 and the index value M (the index value associated with the second bank of bloom filters 520) can be equal to 4. In some embodiments, the first bank of bloom filter modules 510 can have more 16 bloom filter modules or less than 16 bloom filter modules, and the first bank of bloom filter modules 520 can have more 4 bloom filter modules or less than 4 bloom filter modules. In some embodiments, the second bank of bloom filter modules 520 can have a number of bloom filter modules that is an integer fraction of the number of bloom filter modules included in the first bank of bloom filter modules 510. In some embodiments, the number of bloom filter modules included in the first bank of bloom filter modules 510 can be defined based on a number of hash key vectors that can typically be defined by, for example, a range selection module such as range selection module 130 shown in FIG. 1 based on an address value from a data packet. In some embodiments, the number of bloom filter modules included in the second bank of bloom filter modules 520 can be defined based on a statistical probability of a specified number of hash key vectors surviving the first bank of bloom filter modules 510.

In some embodiments, one or more of the bloom filter modules from the first bank of bloom filter modules 510 and/or one or more of the bloom filter modules from the second bank of bloom filter modules 520 can be configured to use one or more filter tables (such as filter table 460 shown in FIG. 4). For example, bloom filter module $1BF_1$ and bloom filter module $1BF_{T-1}$ can be configured to access a common filter table (not shown) or different filter tables (not shown). In some embodiments, each of the bloom filter modules from the first bank of bloom filter modules 510 can include a substantially similar (or identical) hash function module (not shown). In some embodiments, each of the bloom filter modules from the second bank of bloom filter modules 520 can include a substantially similar (or identical) hash function module (not shown) that can be different than a hash function module (not shown) included in one or more of the bloom filter modules from the first bank of bloom filter modules 510.

Although the filter module 540 shown in FIG. 5 has two banks of bloom filter modules that are staged—the first stage of bloom filter modules 510 and the second stage of bloom filter modules 520, in some embodiments, the filter module 540 can have more than two banks of bloom filter modules (not shown) that are arranged so that the hash key vectors 530 can be processed based on any combination of serial processing and parallel processing. In some embodiments, the filter module 540 can include different types of filter sub-modules such as a Bloomier filter module.

Referring back to FIG. 1, the subset of hash key vectors 18 defined at the filter module 140 can be sent to the hashing module 150 for further processing. In some embodiments, the hash key vectors from the subset of hash key vectors 18 can be processed at the hashing module 150 based on an order. In some embodiments, the order can be defined based on the range values included in the hash key vectors from the subset of hash key vectors 18. For example, if the range values included in the hash key vectors from the subset of hash key vectors 18 are prefix length values, the hash key vectors from the subset of hash key vectors 18 can be rank ordered based on the prefix length values (e.g., rank ordered based on the longest prefix length value). Processing of the hash key vectors from the subset of hash key vectors 18, can start with the hash key vectors that have the longest prefix length values until the policy vector 14 is produced. In some embodiments, if all of the hash key vectors from the subset of hash key vectors 18 are processed at the hashing module 150 without producing a policy vector 14, the policy vector module 100 can be configured to, for example, produce a default policy vector (not shown).

In some embodiments, the hashing module 150 can include a hash function module (not shown in FIG. 1) and a hash table 152. In some embodiments, the hash function module can be based on any type of hash function configured to define a hash value based on a hash key vector. The policy vector 14 can be retrieved from the hash table 152 based on processing of one or more hash key vectors from the subset of hash key vectors 18 at the hash function module. In some embodiments, the hash key vectors from the subset of hash key vectors 18 can be processed at the hashing module 150 based on any combination of serial processing and/or parallel processing through one or more hash function modules (not shown) and/or one or more hash tables (not shown). For example, in some embodiments, the hashing module 150 can be configured to implement a cuckoo hash function strategy. In some embodiments, a hash function module(s) included in the filter module 140 can be substantially the same as a hash function module(s) included in the hashing module 150. An example of a hashing module that includes a hash function module and a hash table is described below in connection with FIG. 6, and an example of a hash table is described below in connection with FIG. 7.

Figure 6:
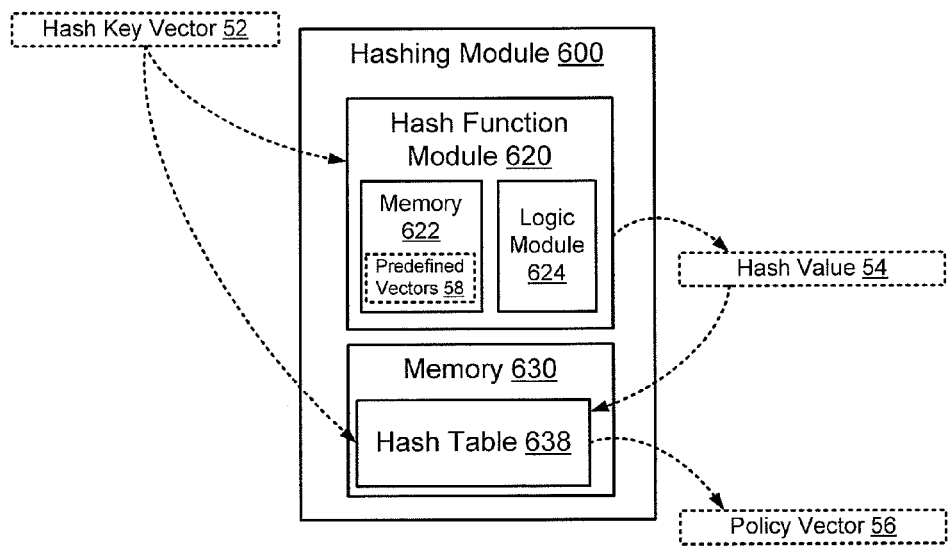
FIG. 6 is a schematic block diagram that illustrates a hashing module, according to an embodiment.

FIG. 6 is a schematic block diagram that illustrates a hashing module 600, according to an embodiment. Specifically, the hashing module 600 has a hash function module 620 and a memory 630 configured to store a hash table 638. The hash function module 620 can be configured to define (e.g., produce) a hash value 54 based on the hash key vector 52. The hash value 54 and the hash key vector 52 can be used by the hashing module 600 to retrieve policy vector 56 from the hash table 638. In some embodiments, the hash value 54 can be a hash address value used to retrieve the policy vector 56 from a specified memory location within the memory 630. In some embodiments, the hash value 54 can be referred to as an index value, a hash code, a hash sum, and so forth.

As shown in FIG. 6, the hash function module 620, which is configured to define the hash value 54 based on the hash key vector 52, includes a memory 622 and a logic module 624. The hash function module 620 is configured to define the hash value 54 based on a one or more predefined vectors 58 stored in the memory 622. Specifically, one or more of the predefined vectors 58 can be processed at the logic module 624 (e.g., serially combined in bitwise combinations at the logic module 624) to define the hash value 54. One or more of the predefined vectors 58 can be selected by the logic module 624 based on one or more portions of the hash key vector 52. In some embodiments, a subset of the predefined vectors 58 can be selected based on a sequence of bit values defining the hash key vector 52. For example, a predefined vector can be selected from the predefined vectors 58 when a condition associated with a bit value (or combination of bit values) from the hash key vector 52 is satisfied. More details related to a hashing module and a hash function module are set forth in U.S. patent application Ser. No. 12/242,158, which has been incorporated herein by reference in its entirety.

Figure 7:
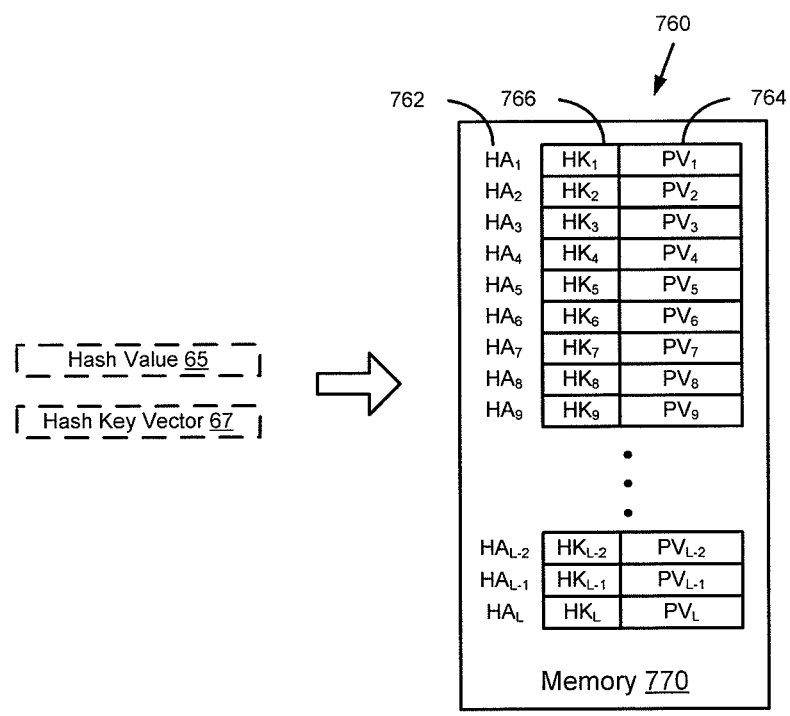
FIG. 7 is a schematic block diagram that illustrates a hash table that includes policy vectors, according to an embodiment.

FIG. 7 is a schematic block diagram that illustrates a hash table 760 that includes policy vectors 764, according to an embodiment. The hash table 760 includes policy vectors $PV_1$ through $PV_L$ (shown in column 764) and includes hash key vectors $HK_1$ through $HK_L$ (shown in column 766). Each of the policy vectors 764 and each of the hash key vectors 766 is associated with a location within a memory 770 represented by one of the address values $HA_1$ through $HA_L$. Each row in the hash table 760 that includes one of the policy vectors 764 and one of the hash key vectors 766 can be referred to as an entry or as an indexed entry. In some embodiments, the address values 762 can be referred to as memory address values. In some embodiments, the memory 770 can have a relatively sparse population of entries.

The hash value 65 can be used to locate at least one of the entries stored in the hash table 760 at a particular address value 762. In some embodiments, the hash value 65 can correspond with one of the address values 762. In some embodiments, the hash table 760 can include a logic module (not shown) that can use bit values that define the hash value 65 to retrieve one of the policy vectors 764 from the hash table 760. In other words, the logic module can be configured to translate the hash value 65 into an address value 762 of the memory 770.

After an entry (or indexed entry) has been selected based on the hash value 65, the hash key vector 67 is compared with a hash key vector (from the hash key vectors 766) included in the entry. If the hash key vector 67 matches the hash key vector included in the entry, a policy vector (from the policy vectors 764) included in the entry is retrieved. In some embodiments, a portion of the hash key vector 67 and a portion of one of the hash key vectors 766 can be compared when an entry is selected based on the hash value 65.

In some embodiments, the memory 770 can be any type of memory such as a ROM or a RAM, and the hash table 760 can be a LUT, a memory array, and/or a database (e.g., a relational database). In some embodiments, the policy vectors 764 stored in the hash table 760 can be compressed policy vectors. Accordingly, the memory 770 can be relatively small and can be integrated with a hashing module (not shown in FIG. 7) on a single (and/or common) semiconductor chip. The compress policy vectors can be compressed based on a pattern compression scheme and/or a run-length compression scheme. More details related to compression and decompression of policy vectors are set for in U.S. patent application Ser. No. 12/242,143, filed Sep. 30, 2008, entitled, "Methods and Apparatus for Compression in Packet Classification," which is incorporated herein by reference in its entirety.

Referring back to FIG. 1, after the policy vector 14 has been produced by the policy vector module 100, the data packet 12 can be processed at a packet processing module 160 based on the policy vector 14. In some embodiments, the packet processing module 160 can be configured to execute an instruction based on one or more bit values defined within the policy vector 14. For example, a routing policy can include a policy condition (e.g., a match condition, a filter condition) that is associated with a routing instruction. The routing policy can be defined so that when the policy condition is satisfied as determined based on processing of at least a portion of a data packet (e.g., based on processing at the policy vector module 100), the data packet can be processed in accordance with the routing instruction at packet processing module 160. The packet processing module 160 can receive the policy vector 14 from the policy vector module 100 and can determine that the policy condition has been satisfied based on a set of bit values included in the policy vector 14. The packet processing module 160 can then process the data packet 12 based on the routing instruction. More details related to processing of a data packet, based on an instruction are set forth in U.S. patent application Ser. No. 12/242,168, filed Sep. 30, 2008, entitled "Methods and Apparatus for Packet Classification associated with a Multi-Stage Switch," now U.S. Pat. No. 7,961,734, and U.S. patent application Ser. No. 12/242,172, filed Sep. 30, 2008, entitled "Methods and Apparatus for Packet Classification Based on Policy Vectors," now U.S. Pat. No. 7,835, 357, both of which are incorporated by reference herein in their entireties.

In some embodiments, the policy vector module 100 can be a hardware-based module (e.g., a processor, an application-specific integrated circuit (ASIC), a field programmable gate array (FPGA)). In some embodiments, the modules within the policy vector module 100 (including tables, combinational logic, etc.) can be integrated in hardware into a single (or common) semiconductor chip. In some embodiments, the functions associated within the modules within the policy vector module 100 can be implemented as different modules and/or can be combined into one or more modules. In some embodiments, one or more portions of the policy vector module 100 can be implemented in software (e.g., a set of instructions executable at a processor, a software application). In some embodiments, one or more portions (e.g., operations, functions) of the policy vector module 100 can be implemented in a combination of hardware and software. In some embodiments, the packet processing module 160 can be included in the policy vector module 100.

Although not shown, in some embodiments, the policy vector module 100 can include more than one processing pipeline. For example, a first processing pipeline can be configured to produce a first policy vector based on a first portion of the data packet 12 and a second processing pipeline similar to (or the same as) the first processing pipeline can be configured to produce a second policy vector based on the a second portion of the data packet 12. In some embodiments, the first portion of the data packet 12 and the second portion of the data packet 12 can be mutually exclusive, overlapping, or the same. In some embodiments, the first policy vector and the second policy vector can be combined based on combinational logic. In some embodiments, the first portion of the data packet 12 can be associated with an address value and the second portion of the data packet 12 can be associated with a range value. In some embodiments, the first portion of the data packet 12 can be associated with a source address value and the second portion of the data packet 12 can be associated with a destination address value. More details related to parallel processing of portions of data packets are set forth in U.S. patent application Ser. No. 12/242,168, now U.S. Pat. No. 7,961,734, and U.S. patent application Ser. No. 12/242,172, now U.S. Pat. No. 7,835,357, both of which have been incorporated by reference herein in their entireties.

Although not shown, in some embodiments, the policy vector 14 can be processed at an exception module. In some embodiments, for example, the exception module can be configured to handle an exception to a policy condition related to the data packet 12 and can be configured to modify the policy vector 14 accordingly. In some embodiments, an exception to a policy condition can be associated with an instruction and can be defined within a policy. For example, a first instruction can be executed when a policy condition is satisfied and a different instruction can be executed when the policy condition is satisfied but an exception to the policy condition is also satisfied. More details related to a handling of an exception related to a policy condition are set forth in U.S. patent application Ser. No. 12/242,278, filed Sep. 30, 2008, entitled, "Methods and Apparatus to Implement Except Condition During Data Packet Classification," which is incorporated herein by reference in its entirety.

Figure 8:
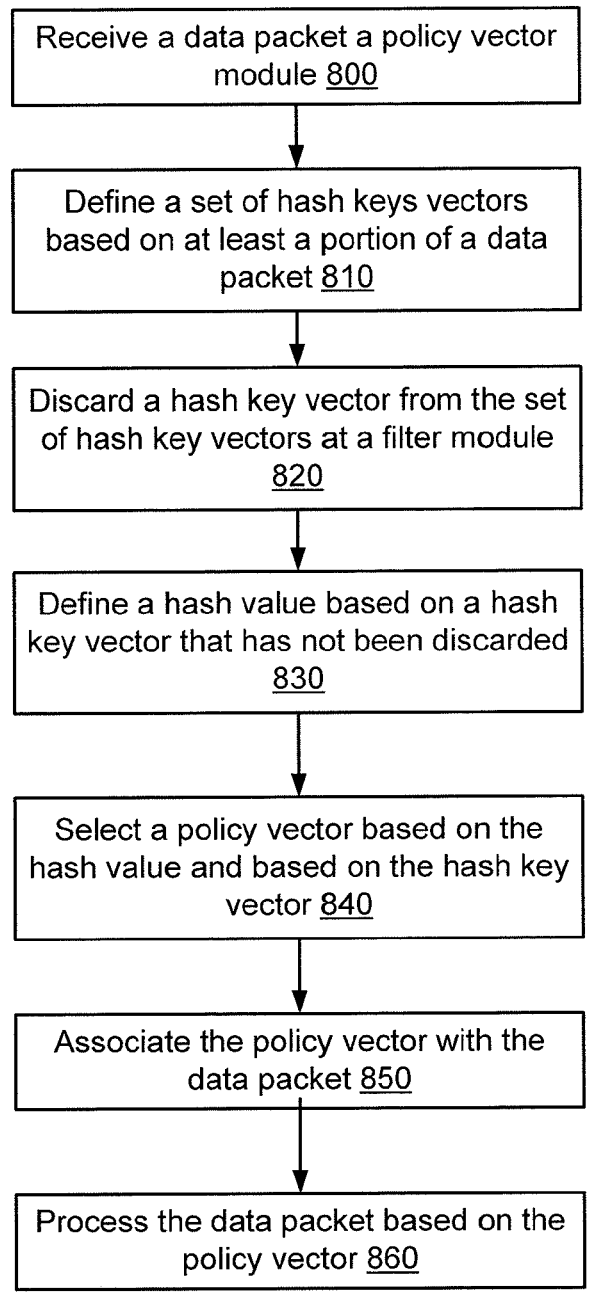
FIG. 8 is a flowchart that illustrates a method for associating a policy vector with a data packet based on processing of a portion of the data packet, according to an embodiment.

FIG. 8 is a flowchart that illustrates a method for associating a policy vector with a data packet based on processing of a portion of the data packet, according to an embodiment. As shown in FIG. 8, a data packet can be received at a policy vector module, at 800. The policy vector module can be included in a multi-stage switch and the data packet can be received from a network entity in communication with the multi-stage switch. In some embodiments, the policy vector module can be included in a packet classification module of the multi-stage switch. In some embodiments, the entire policy vector module can be implemented in hardware.

A set of hash keys vectors can be defined based on at least a portion of a data packet, at 810. The set of hash key vectors can be defined based on, for example, at least a portion of an address value and/or a port value included in the data packet. In some embodiments, one or more of the hash key vectors can be defined based on a range value such as a prefix length value or a range of port values. In some embodiments, a set of range values can be selected from a table based on a portion of the data packet. The number of hash key vectors in the set of hash key vectors can be correlated to the number range values included in the set of range values. In some embodiments, a range value can be included in each of the hash key vectors from the set of hash key vectors.

A hash key vector can be discarded from the set of hash key vectors at a filter module, at 820. In some embodiments, an index value associated with a filter table can be defined based on the hash key vector; the hash key vector can be discarded based on a filter value retrieved from the filter table based on the index value. Specifically, the hash key vector can be discarded when the filter value satisfies a condition. In some embodiments, the filter module can include one or more bloom filter modules and/or one or more banks of bloom filter modules. The bloom filter modules can be arranged for serial and/or parallel processing of the set of hash key vectors. If the filter module includes a bank of bloom filter modules, each hash key vector from the set of hash key vectors can be processed in parallel through the bank of bloom filter modules.

In some embodiments, none of hash key vectors included in the set of hash key vectors can be discarded at the filter module. In some embodiments, if all of the hash key vectors from the set of hash key vectors are discarded at the filter module, a default policy vector can be selected and associated with the data packet.

A hash value can be defined based on a hash key vectors that has not been discarded, at 830. In some embodiments, the hash key vector that has not been discarded can be referred to as a remainder hash key vector. In some embodiments, the hash value can be calculated based on a hash function implemented in a hashing module. In some embodiments, the hash value can be defined based on predefined vectors stored at the hashing module.

A policy vector can be selected based on the hash value and based on the hash key vector, at 840. In some embodiments, the policy vector can be selected from a hash table. In some embodiments, the policy vector can be selected when at least a portion of the hash key vector matches a portion of an entry associated with the hash value.

The policy vector can be associated with the data packet, at 850, and the data packet can be processed based on the policy vector, at 860. In some embodiments, the data packet can be processed at a processing module. In some embodiments, the data packet can be processed based on an instruction associated with a policy. In some embodiments, the instruction can be retrieved based on one or more bit values (e.g., a single bit value, a sequence of bit values) that are set within the policy vector.

In some embodiments, if multiple hash key vectors have not been discarded at 820, the hash key vectors can be ordered in a sequence based on a value encoded within the bit values that define the hash key vector. In other words, the hash key vectors can be queued in the sequence. In some embodiments, the hash key vectors can be ordered in the sequence based on range values included in the hash key vectors.

After the hash key vectors have been ordered, the hash key vectors can be processed starting with the first hash key vector in the sequence until a policy vector can be selected based on one of the hash key vectors. For example, a hash value can be defined based on the first hash key vector at a hashing module. If a policy vector can be retrieved from the hash table based on processing of the first hash key vector then further processing of the remaining hash key vectors in the sequence is not performed. If a policy vector cannot be retrieved from the hash table based on processing of the first hash key vector because, for example, a portion of the first hash key vector does not match an entry within the hash table, processing of the rest of the hash key vectors can be continued in order until a policy vector can be retrieved from the hash table.

Figure 9:
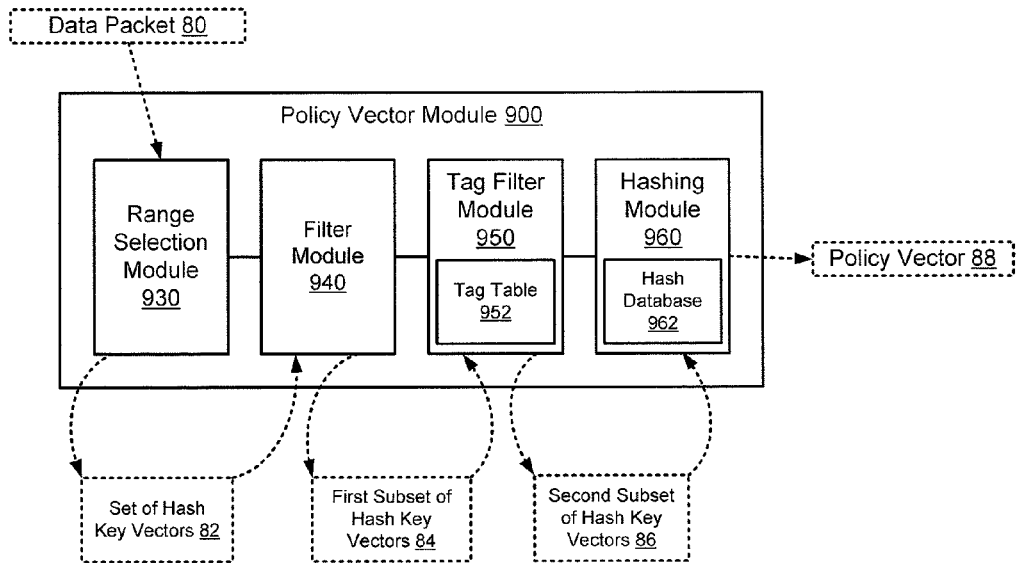
FIG. 9 is a schematic block diagram that illustrates a policy vector module, according to an embodiment.

FIG. 9 is a schematic block diagram that illustrates a policy vector module 900, according to an embodiment. As shown in FIG. 9, the policy vector module 900 includes a range selection module 930, a filter module 940, a tag filter module 950, and a hashing module 960. In some embodiments, the filter module 940 can be a filter module similar to (or the same as) filter module 140 shown in FIG. 1, and can be referred to as a preliminary filter module. In some embodiments, the tag filter module 950 can be referred to as a secondary filter module.

As shown in FIG. 9, the range selection module 930 can be configured to define a set of hash key vectors 82 based on at least a portion of a data packet 80 and based on range values included in a range table (not shown in FIG. 9). The filter module 940 can be configured to produce a first subset of hash key vectors 84 by discarding one or more of the hash key vectors from the set of hash key vectors 82 when a first filter condition is satisfied.

The tag filter module 950 can be configured to produce a second subset of hash key vectors 86 by discarding one or more of the hash key vectors included in the first subset of hash key vector 84 when a second filter condition is satisfied. The policy vector 88 can be produced by the hashing module 950 based on processing of the second subset of hash key vectors 86 at the hashing module 950. Specifically, the policy vector 88 can be retrieved from a hash table 962 based on a hash key vector from the second subset of hash key vectors 86.

The tag filter module 950 can be configured to potentially further discard hash key vectors from the set of hash key vectors beyond the discarding performed by the filter module 940 so that a processing load at the hashing module 960 can be reduced. Thus, in some embodiments, the second subset of hash key vectors 86 can include less hash key vectors than are included in the first subset of hash key vectors 84 or than are included in the set of hash key vectors 82. In some embodiments, the first subset of hash key vectors 84 and/or the second subset of hash key vectors 86 can include one hash key vector. The tag filter module 950 can be defined so that a probability of producing a single hash key vector is substantially equal to 100%.

The tag filter module 950 can be configured to discard a hash key vector from the first subset of hash key vectors 84 when a condition is satisfied. In some embodiments, for example, the tag filter module 950 can be configured to compare a portion of a hash key vector from the first subset of hash key vectors 84 with a tag table 952 included in the tag filter module 950. If the portion of the hash key vector can be matched with an entry within the tag table 952, the hash key vector is included in the second subset of hash key vectors 86. If the portion of the hash key vector cannot be matched with an entry within the tag table 952, the hash key vector is discarded (e.g., is not included in the second subset of hash key vectors 86).

In some embodiments, the policy vector module 900 (including all modules) can be implemented in hardware in a single (or common) semiconductor chip. In some embodiments, the hash table 962 can be included in a memory separate from the semiconductor chip. In some embodiments, the hash table 962 can be included in a remote device (not shown) that can be, for example, separate from a multi-stage switch in which the policy vector module 900 is included. Although not shown in FIG. 9, the tag table 952 can be a LUT, memory array, or a database (e.g., a relational database) and can be stored in a memory (e.g., a ROM).

Figure 10:
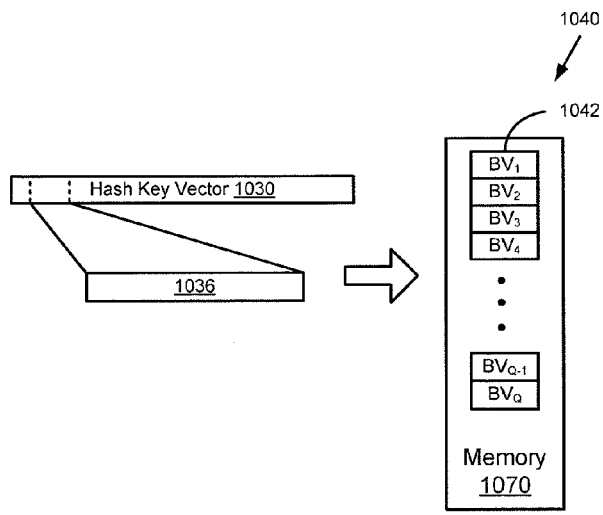
FIG. 10 is a schematic diagram that illustrates a tag table stored in a memory, according to an embodiment.

FIG. 10 is a schematic diagram that illustrates a tag table 1040 stored in a memory 1070, according to an embodiment. As shown in FIG. 10, the tag table 1040 includes bit vectors $BV_1$ through $BV_Q$ (shown in column 1042). Each bit vector from the bit vectors 1042 can correspond to a portion of a hash key vector included in a hash table such as hash table 962 shown in FIG. 9. In some embodiments, the tag table 1040 can include a bit vector for each entry (e.g., each indexed entry) included in a hash table. In some embodiments, the tag table 1040 can include a bit vector for at least some of the entries (e.g., at least some of the indexed entries) included in a hash table. In some embodiments, the tag table 1040 can have a relatively sparse population of bit vectors 1042.

As shown in FIG. 10, a portion 1036 of a hash key vector 1030 can be compared with the bit vectors 1042 included in the tag table 1040. When the portion 1036 of the hash key vector 1030 matches at least one of the bit vectors 1042 (e.g., one or more of the bit vectors 1042), then the hash key vector 1030 can be sent to, for example, a hashing module for further processing. When the portion 1036 of the hash key vector 1030 does not match any of the bit vectors 1042, then the hash key vector 1030 can be discarded. In some embodiments, the bit vectors 1042 can have a length of one or more bit values (e.g., 2 bits, 5 bits, 8 bits, 70 bits)

Figure 11:
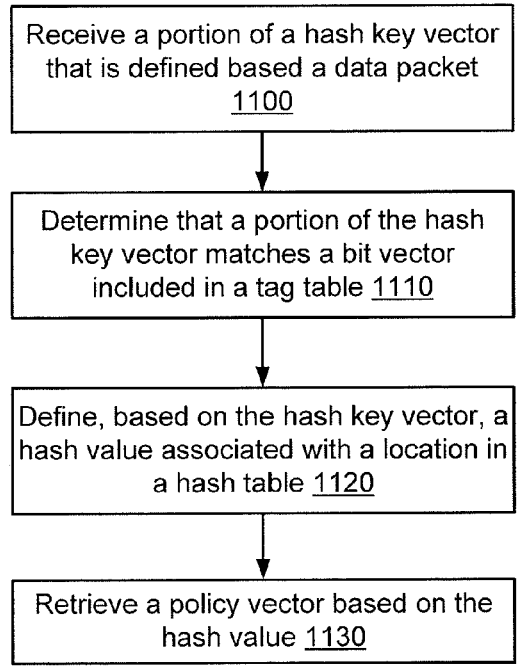
FIG. 11 is flowchart that illustrates a method for producing a hash value based on a hash key vector, according to an embodiment.

FIG. 11 is flowchart that illustrates a method for producing a hash value based on a hash key vector, according to an embodiment. As shown in FIG. 11, a portion of a hash key vector that is defined based a data packet is received, at 1100. The hash key vector can be defined based on at least a portion of an address value and/or a port value included in the data packet.

When a portion of the hash key vector matches a bit vector included in a tag table as determined at 1110, a hash value associated with a location in a hash table can be defined based on the hash key vector, at 1120. In some embodiments, if the portion of the hash key vector does not match a bit vector included in the tag table, the hash key vector can be discarded.

A policy vector is retrieved based on the hash value, at 1130. The policy vector can be retrieved from a hash table. In some embodiments, the hash table can be stored in a memory integrated in a semiconductor chip that is mutually exclusive from a semiconductor chip where the tag table is stored. In some embodiments, the hash table can be stored in a remote memory that can be accessed via a network.

Figure 12:
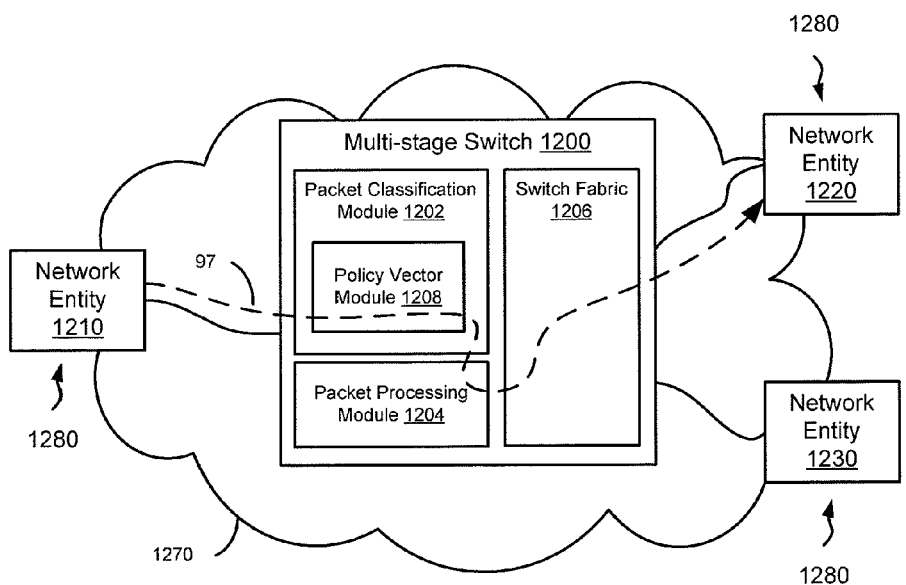
FIG. 12 is a schematic block diagram that illustrates a policy vector module included in packet classification module of a multi-stage switch, according to an embodiment.

FIG. 12 is a schematic block diagram that illustrates a policy vector module 1208 included in packet classification module 1202 of a multi-stage switch 1200, according to an embodiment. The multi-stage switch 1200 includes a switch fabric 1206 that can have multiple stages (e.g., an ingress stage, an egress stage, a middle stage) through which a data packet can be routed. In some embodiments, the switch fabric 1206 can be defined based on a Clos network architecture (e.g., a non-blocking Clos network, a strict sense non-blocking Clos network, a Benes network). In some embodiments, a network architecture such as, for example, a Clos network and/or a Benes network can be reconfigurable (e.g., rearrangeable). In some embodiments, the switch fabric 1206 can be a reconfigurable switch fabric and/or a time-division multiplexed switch fabric.

The policy vector module 1208 included in the packet classification module 1202 can be configured to receive a data packet from at least one of the network entities 1280, which include network entity 1210, network entity 1220, and network entity 1230, and is configured to classify the data packet so that the data packet can be processed based on a policy. The policy can include one or more policy conditions associated with an instruction that can be executed at the multi-stage switch 1200. The policy vector module 1208 can be configured to implement the policy condition. The data packet can be processed at a packet processing module 1204 based on an instruction associated with the policy condition when the policy condition is satisfied. In some embodiments, the packet processing module 1202 can execute one or more portions of the instruction associated with the policy and/or can trigger another entity (not shown) to execute one or more portions of the instruction associated with the policy. In some embodiments, processing of a data packet based on the instruction can include, for example, logging information related to the data packet, verifying information at the multi-stage switch 1200, forwarding the data packet to a specific destination such as one of the network entities 1280, dropping the data packet (or a related data packet), routing a portion of a data packet flow associated with the data packet through switch fabric 1206 of the multi-stage switch 1200, and so forth.

In some embodiments, the policy vector module 1208 included in the packet classification module 1202 can be configured to define (e.g., produce) a policy vector based on one or more portions of a data packet. The policy vector can include one or more bit values that represent whether or not a policy condition associated with a policy has been satisfied based on the portion(s) of the data packet. The policy vector can be used by the packet processing module 1204 to process the data packet and/or to trigger processing of the data packet at the multi-stage switch 1200, based on an instruction associated with the policy (when the bit value(s) indicate that the policy condition has been satisfied).

As shown in FIG. 12, a data packet 97 is sent from network entity 1210 and received at the multi-stage switch 1200. Data packet 97 is classified at the packet classification module 1202. Specifically, the policy vector module 1208 included in the packet classification module 1202 can be configured to associate (e.g., match) data packet 97 with a policy vector based on information from the data packet 97. As shown in FIG. 12, the data packet 97 is routed through the switch fabric 1206 to network entity 1220 based on processing of the data packet 97 at packet processing module 1204. The processing of the data packet 97 at the packet processing module 1204 can be triggered based on the policy vector associated at the policy vector module 1208 included in the packet classification module 1202 with the data packet 97.

In some embodiments, each of the network entities 1280 (e.g., network entity 1210) can be a wired device and/or a wireless device and can be, for example, a computing entity (e.g., a personal computing device), a mobile phone, a personal digital assistant (PDA), and/or a server (e.g., a web server/host). In some embodiments, each of the network entities 1280 can function as a source device and/or as a destination device. Each of the network entities 1280 can be configured to operate based on one or more platforms that can include one or more types of hardware, software, operating systems, runtime libraries, and so forth. The network 1270 can be, for example, a virtual network, a local area network (LAN) and/or a wide area network (WAN) and can include one or more wired and/or wireless segments. In some embodiments, one or more of the network entities 1280 can be at the edges of a data center (not shown).

The packet classification module 1202 and/or the packet processing module 1204 can be a hardware-based module. In other words, the packet classification module 1202 and/or the packet processing module 1204 can be implemented entirely in hardware. In some embodiments, the entire packet classification module 1202 (including look-up tables associated with the packet classification module 1202) and/or the packet processing module 1204 can be integrated on one or more semiconductor chips that can have one or more substrates. In some embodiments, one or more portions of the packet classification module 1202 and/or the packet processing module 1204 can be implemented in software. In some embodiments, one or more portions (e.g., operations, functions) of the packet classification module 1202 and/or the packet processing module 1204 can implemented in a combination of hardware and software.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, a policy vector module can include a processing pipeline configured to process a set of hash key vectors at a tag filter module before any of the hash key vectors from the set of hash key vectors are processed at a bloom filter module. In some embodiments, a policy vector module can include a tag filter module and can exclude a bloom filter module.

What is claimed is:

1. An apparatus, comprising:
 a range selection module configured to define a set of hash key vectors based on a set of range values associated with at least a portion of an address value from a data packet received at a multi-stage switch;
 a first stage of bloom filters and a second stage of bloom filters collectively configured to determine that at least a portion of a hash key vector from the set of hash key vectors has a probability of being included in a hash table; and
 a hashing module configured to produce a hash value based on the hash key vector such that a first policy vector is selected based on the hash value and the first policy vector is decompressed to produce a second policy vector associated with the data packet.

2. The apparatus of claim 1, wherein the second policy vector is configured to trigger routing of the data packet through the multi-stage switch.

3. The apparatus of claim 1, further comprising:
 a tag filter module configured to match a portion of the hash key vector to a bit vector stored in a tag table, the hashing module configured to define the hash value in response to the portion of the hash key vector being matched to the bit vector stored in the tag table.

4. The apparatus of claim 1, wherein the portion of the address value is a first portion of the address value, the hash key vector includes a plurality of binary bits having a length corresponding to a range value from the set of range values and a plurality of binary bits corresponding to a second portion of the address value from the data packet, the second portion of the address value being associated with the range value from the set of range values.

5. The apparatus of claim 1, wherein the range selection module, the first stage of bloom filters, the second stage of bloom filters, and the hashing module are implemented in hardware and integrated on a single semiconductor chip.

6. The apparatus of claim 1, further comprising:
a memory configured to store a range table including the set of range values, the range selection module configured to retrieve the set of range values from the range table based on the portion of the address value from the data packet.

7. An apparatus, comprising:
a plurality of bloom filters collectively configured to receive a set of hash key vectors associated with a portion of an address value from a data packet, the plurality of bloom filters collectively configured to determine that at least a portion of a hash key vector from the set of hash key vectors has a probability of being included in a hash table; and
a hashing module configured to produce a hash value based on the hash key vector, the hashing module configured to select a policy vector from the hash table based on the hash value and based on the portion of the hash key vector from the plurality of the bloom filters.

8. The apparatus of claim 7, further comprising:
a range selection module configured to receive the data packet, the range selection module configured to define the set of hash key vectors based on a set of range values associated with the portion of the address value.

9. The apparatus of claim 7, wherein the plurality of bloom filters are implemented in hardware.

10. The apparatus of claim 7, wherein the hashing module is configured to perform at least two hash functions via hardware computational units.

11. The apparatus of claim 7, wherein the plurality of bloom filters and the hashing module are each implemented as hardware units.

12. The apparatus of claim 7, wherein the plurality of bloom filters and the hashing module are implemented in hardware and integrated on a single semiconductor chip.

13. The apparatus of claim 7, further comprising:
a range selection module configured to receive the data packet, the range selection module configured to define the set of hash key vectors based on a set of range values associated with the portion of the address value; and
a memory configured to store a range table including the set of range values, the range selection module configured to retrieve the set of range values from the range table based on the portion of the address value from the data packet.

14. The apparatus of claim 7, further comprising:
a first memory configured to store a tag table including a plurality of bit vectors, each bit vector from the plurality of bit vectors corresponding to at least a portion of an entry within the hash table,
the filter module, the hashing module and the tag table are implemented in hardware and integrated on a semiconductor chip, the hash table is included in a second memory separate from the semiconductor chip.

15. An apparatus, comprising:
a switch fabric of a multi-stage switch of a data center;
a policy vector module operatively coupled to the switch fabric, the policy vector module configured to receive a data packet and configured to define a set of key vectors based on a set of range values associated with a portion of an address value from the data packet, the policy vector module configured to select a remainder key vector from the set of key vectors, the policy vector module configured to select a policy vector from a policy vector database based on the remainder key vector; and
a packet processing module operatively coupled to the policy vector module and configured to receive the policy vector from the policy vector module, the packet processing module configured to trigger routing of the data packet via the switch fabric when at least one bit value of the policy vector represents that a policy condition associated with a routing policy has been satisfied.

16. The apparatus of claim 15, wherein the policy vector module includes a range selection module configured to define the set of key vectors based on the set of range values associated with at least the portion of the address value from the data packet received at the multi-stage switch.

17. The apparatus of claim 15, wherein the policy vector module includes a first stage of bloom filters and a second stage of bloom filters collectively configured to determine that the reminder key vector from the set of key vectors has a probability of being included in a hash table.

18. The apparatus of claim 15, wherein the policy vector module includes a hashing module configured to produce a hash value such that the policy vector is selected based on the hash value.

19. The apparatus of claim 15, further comprising:
a memory configured to store a range table including the set of range values, the policy vector module configured to retrieve the set of range values from the range table based on the portion of the address value from the data packet.

20. The apparatus of claim 15, wherein the policy vector module is implemented in hardware on a single semiconductor chip.

* * * * *